(12) United States Patent
Staley

(10) Patent No.: US 6,909,849 B1
(45) Date of Patent: Jun. 21, 2005

(54) REMOTE CONTROL AND FLASHLIGHT SYSTEM

(76) Inventor: Sandra A. Staley, 6922 Concord Dr., Apt. B, Tampa, FL (US) 33614

( * ) Notice: Subject to any disclaimer, the term of this patent is extended or adjusted under 35 U.S.C. 154(b) by 679 days.

(21) Appl. No.: 09/833,947

(22) Filed: Apr. 12, 2001

(51) Int. Cl.$^7$ .............................................. H04B 10/00
(52) U.S. Cl. ...................................... 398/106; 398/118
(58) Field of Search ................................. 398/201, 116, 398/117, 106; 340/815.6; 341/176; 348/734

(56) References Cited

U.S. PATENT DOCUMENTS

| | | | | |
|---|---|---|---|---|
| 5,055,977 A | * | 10/1991 | Acquanetta | 362/23 |
| 5,203,622 A | * | 4/1993 | Sottile | 362/109 |
| 5,564,814 A | * | 10/1996 | Anderson | 362/109 |
| 5,590,950 A | * | 1/1997 | Hildebrand | 362/109 |
| 6,050,696 A | * | 4/2000 | Radley | 362/109 |
| 6,329,943 B1 | * | 12/2001 | Pasawicz | 341/176 |

\* cited by examiner

*Primary Examiner*—Jason Chan
*Assistant Examiner*—Dalzid Singh
(74) *Attorney, Agent, or Firm*—Edward P. Dutkiewicz

(57) ABSTRACT

A remote control and flashlight has a housing with top and bottom portions. A periphery between the portions has at least one aperture there through. The top portion also has an upper face with a plurality of holes. The bottom portion has a bottom face with a window and a latchable covering. An infrared light emitting diode transmits a narrow beam of modulated infrared light having a central axis of dissemination. A lightbulb for emits visible light with a central axis of dissemination. A power source is electrically coupled to the infrared light emitting diode and lightbulb. A plurality of function buttons pass through holes in the housing with control circuitry being adapted to activate and modulate the infrared light source. An on/off button passes through a hole in the housing to activate and inactivate the lightbulb.

2 Claims, 3 Drawing Sheets

REMOTE CONTROL AND FLASHLIGHT SYSTEM

BACKGROUND OF THE INVENTION

1. Field of the Invention

The present invention relates to a remote control and flashlight system and more particularly pertains to combining the benefits of a remote control and a flashlight.

2. Description of the Prior Art

The use of remote control devices and flashlights of known designs and configurations is known in the prior art. More specifically, remote control devices and flashlights of known designs and configurations previously devised and utilized for the purpose of coupling the benefits of known remote controls and known flashlights through various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,055,977 to Acquanetta discloses a remote control illuminator. U.S. Pat. No. 5,188,448 to Siriani et al discloses a TV, VCR, stereo, CD and night light. U.S. Pat. No. 5,203,622 to Sottile discloses a remote control lighting unit. U.S. Pat. No. 5,253,068 to Crook et al discloses a gun shaped remote control unit for a television. U.S. Pat. No. 5,564,814 to Anderson discloses a remote control illumination system.

While these devices fulfill their respective, particular objectives and requirements, the aforementioned patents do not describe a remote control and flashlight system that allows combining the benefits of a remote control and a flashlight.

In this respect, the remote control and flashlight system according to the present invention substantially departs from the conventional concepts and designs of the prior art, and in doing so provides an apparatus primarily developed for the purpose of combining the benefits of a remote control and a flashlight.

Therefore, it can be appreciated that there exists a continuing need for a new and improved remote control and flashlight system which can be used for combining the benefits of a remote control and a flashlight. In this regard, the present invention substantially fulfills this need.

SUMMARY OF THE INVENTION

In view of the foregoing disadvantages inherent in the known types of remote control devices and flashlights of known designs and configurations now present in the prior art, the present invention provides an improved remote control and flashlight system. As such, the general purpose of the present invention, which will be described subsequently in greater detail, is to provide a new and improved remote control and flashlight system and method which has all the advantages of the prior art and none of the disadvantages.

To attain this, the present invention essentially comprises a housing. The housing has a top portion and a bottom portion. Each portion has a first end, a second end. Each portion also has a pair of generally parallel side faces between the first end and second end. Additionally, each portion has a first transverse edge adjacent the first end and a second transverse edge adjacent the second end. The top portion also has an upper face with a plurality of holes. The top portion further has a first aperture in the first end and a second aperture in the second end opening into the transverse edges. The bottom portion has a bottom face with a window and a latchable covering. The bottom portion also has a first aperture in the first end and a second aperture in the second end opening into the transverse edges. The top and bottom portions are coupled together with the first and second transverse edges making contact and the two portions forming a single first circular aperture 48 in the combined first ends and a single second circular aperture in the combined second ends. Next provided is an infrared light emitting diode. The diode is located adjacent to the singular first circular aperture formed in the first end. The infrared light emitting diode is able to transmit a narrow beam of modulated infrared light with that infrared light having a central axis of dissemination. A lightbulb is provided for emitting visible light. The lightbulb is located in the single second circular aperture formed in the second end. The lightbulb emits radiation with a central axis of dissemination coaxial with, but in the opposite direction of, the central axis of the infrared light. Additionally provided are a pair of clear plastic covers. Each cover has a hemispherical shape with a convex apex and an open concave bottom. The open bottom of the first cover is coupled to the aperture in the combined first ends and the open bottom of the second cover is coupled to the aperture of the second ends such that the apexes point away from the housing. The coverings form protective layers around the diode and bulb keeping debris out of the housing and preventing hot components from harming a user. Separate power sources are electrically coupled to the infrared light emitting diode and lightbulb. The power sources are accessible through the window of the bottom portion. Lastly, a plurality of function buttons are provided. The buttons pass through holes in the housing. Associated control circuitry is adapted to activate and modulate the infrared light source. An on/off button is provided. The on/off button passes through a hole in the housing to activate and inactivate the lightbulb. The function buttons and associated control circuitry are electrically coupled to the infrared light emitting diode and the power source. The light bulb is electrically coupled to the power source.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remote control and flashlight system which has all of the advantages of the prior art remote control devices and flashlights of known designs and configurations and none of the disadvantages.

It is another object of the present invention to provide a new and improved remote control and flashlight system which may be easily and efficiently manufactured and marketed.

It is further object of the present invention to provide a new and improved remote control and flashlight system which is of durable and reliable constructions.

An even further object of the present invention is to provide a new and improved remote control and flashlight system which is susceptible of a low cost of manufacture with regard to both materials and labor, and which accordingly is then susceptible of low prices of sale to the consuming public, thereby making such remote control and flashlight system economically available to the buying public.

Even still another object of the present invention is to provide a remote control and flashlight system for combining the benefits of a remote control and a flashlight.

Lastly, it is an object of the present invention to provide a new and improved television remote control and flashlight having a housing with top and bottom portions. A periphery between the portions has at least one aperture there through. The top portion also has an upper face with a plurality of holes. The bottom portion has a bottom face with a window and a latchable covering. An infrared light emitting diode transmits a narrow beam of modulated infrared light having a central axis of dissemination. A lightbulb emits visible light with a central axis of dissemination. A power source is electrically coupled to the infrared light emitting diode and lightbulb. A plurality of function buttons pass through holes in the housing with control circuitry being adapted to activate and modulate the infrared light source. An on/off button passes through a hole in the housing to activate and inactivate the lightbulb.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
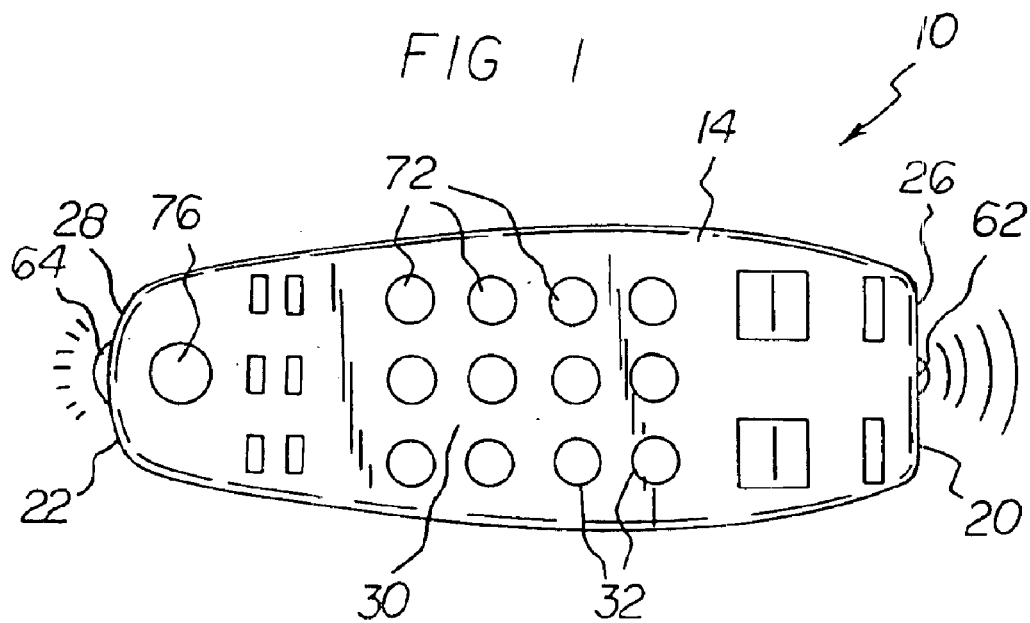
FIG. 1 is a plan view of the preferred embodiment of the present invention.

With reference now to the drawings, and in particular to FIG. 1 thereof, the preferred embodiment of the new and improved remote control and flashlight system embodying the principles and concepts of the present invention and generally designated by the reference numeral 10 will be described.

The present invention, the remote control and flashlight system 10 is comprised of a plurality of components. Such components in their broadest context include a housing, an infrared light emitting diode, a lightbulb, a power source, and a plurality of function buttons. Such components are individually configured and correlated with respect to each other so as to attain the desired objective.

First provided is a housing 14. The housing has a top portion 16 and a bottom portion 18. Each portion has a first end 20, a second end 22. Each portion also has a pair of generally parallel side faces 24 between the first end and second end. Additionally, each portion has a first transverse edge 26 adjacent the first end and a second transverse edge 28 adjacent the second end. The top portion also has an upper face 30 with a plurality of holes 32. The top portion further has a first aperture 34 in the first end and a second aperture 36 in the second end opening into the transverse edges. The bottom portion has a bottom face 38 with a window 40 and a latchable covering 42. The bottom portion also has a first aperture 44 in the first end and a second aperture 46 in the second end opening into the transverse edges. The top and bottom portions are coupled together with the first and second transverse edges making contact and the two portions forming a single first circular aperture 48 in the combined first ends and a single second circular aperture 50 in the combined second ends.

Next provided is a modulated light source, an infrared light emitting diode 54. Other light sources with a modulated beam such as a radio frequency light source could be utilized. The diode is located adjacent to the singular first circular aperture formed in the first end. The infrared light emitting diode is able to transmit a narrow beam of modulated infrared light with that infrared light having a central axis of dissemination. In the preferred embodiment, the modulated light source functions to control a television set. It is also capable of controlling a wide variety of devices including a VCR, DVD, cable, satellite dish, radio device, stereo, CD, laser disc, miscellaneous auxiliaries, home entertainment centers and components thereof.

A lightbulb 58 is provided for emitting visible light. The lightbulb is located in the single second circular aperture 60 formed in the second end. The lightbulb emits radiation with a central axis of dissemination coaxial with, but in the opposite direction of, the central axis of the infrared light. Such lightbulb may be utilized in the event of a general power failure in a house.

Additionally provided are a pair of clear plastic covers 62, 64. Each cover has a hemispherical shape with a convex apex 66 and an open concave bottom. The open bottom of the first cover 62 is coupled to the aperture in the combined first ends and the open bottom of the second cover 64 is coupled to the aperture of the second ends such that the apexes point away from the housing. The coverings form protective layers around the diode and bulb keeping debris out of the housing and preventing hot components from harming a user.

A power source 70 is electrically coupled to the infrared light emitting diode and to the lightbulb. The power source is accessible through the window of the bottom portion. Preferably two power sources, a battery for the lightbulb and two batteries for the diode, are utilized to preclude the possibility of both sources of light failing at the same time.

Lastly, a plurality of function buttons 72 are provided. The buttons pass through holes in the housing. Associated control circuitry 74 is adapted to activate and modulate the infrared light source. An on/off button 76 is provided. The on/off button passes through a hole in the top face of the housing to activate and inactivate the lightbulb. The function buttons and associated control circuitry are electrically coupled to the infrared light emitting diode and the power source. The light bulb is electrically coupled to the power source.

Figure 2:
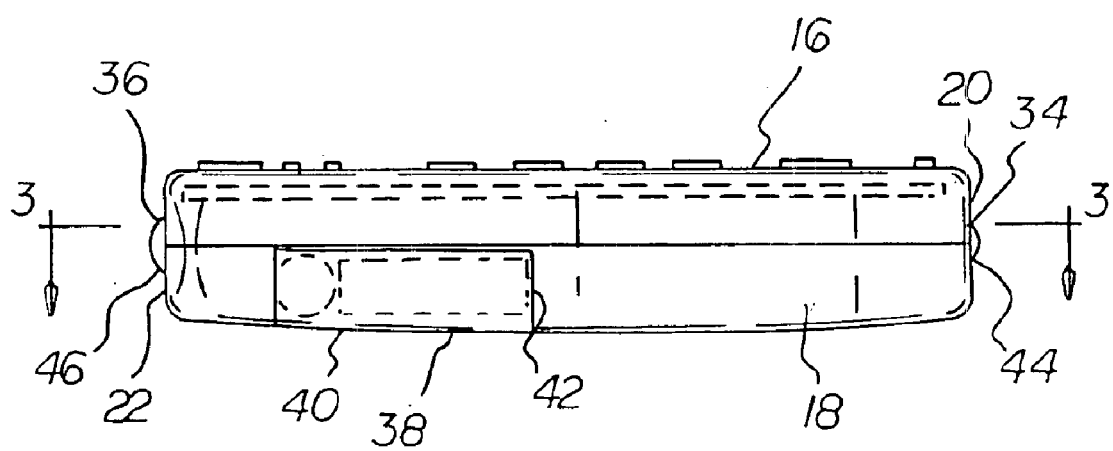
FIG. 2 is a side view of the embodiment of the present invention shown in FIG. 1.
Figure 3:
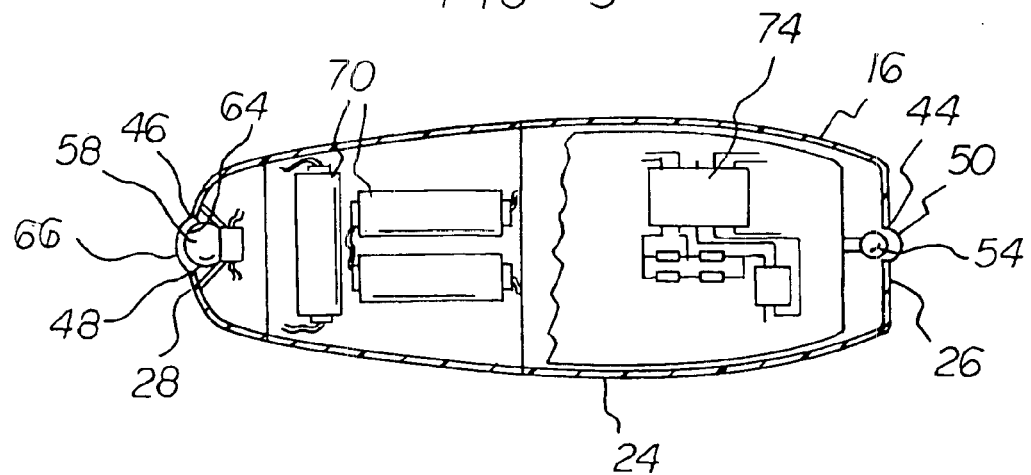
FIG. 3 is a cross sectional view of present invention taken along ling 3—3 of FIG. 2.
Figure 4:
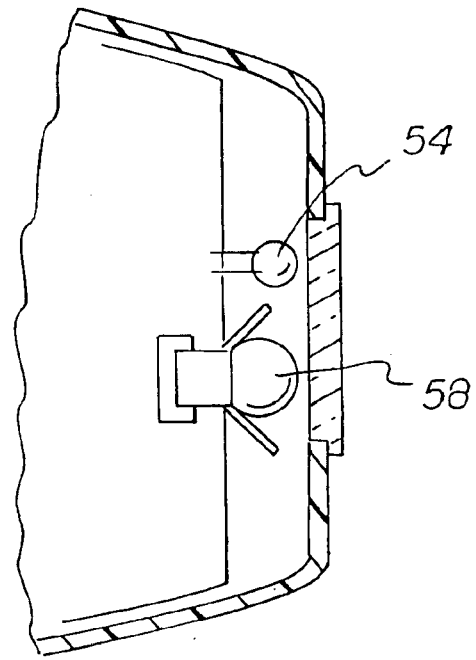
FIG. 4 is cross section view of an alternative embodiment of the present invention.
Figure 5:
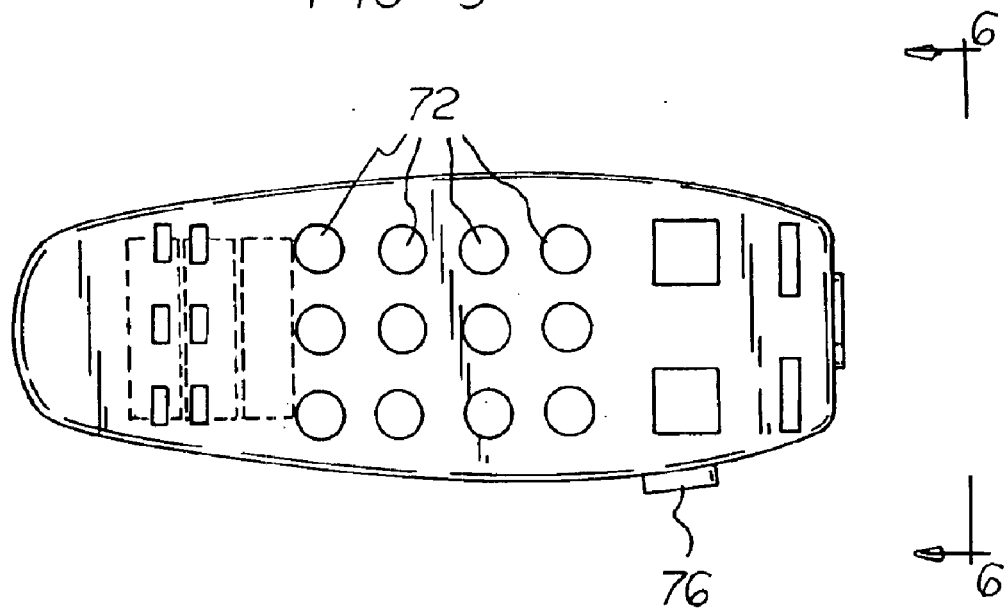
FIG. 5 is a plan view of an alternate embodiment of the invention.
Figure 6:
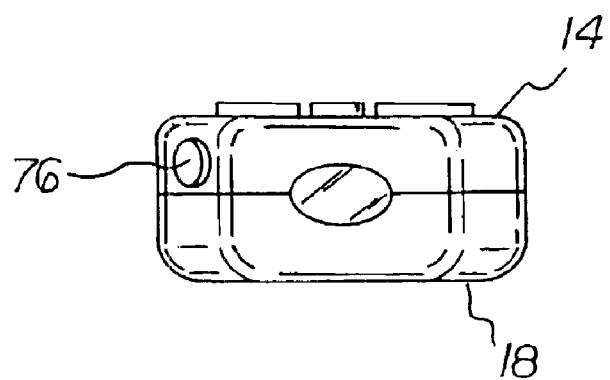
FIG. 6 is an end view taken along line 6—6 of FIG. 5.

An alternate embodiment of the invention is shown in FIGS. 4, 5 and 6. In such embodiment, essentially all of the components are the same as in the primary embodiment of FIGS. 1–3 except that only a singular aperture 80 is provided instead of two. Within the housing, adjacent to the aperture 80, behind a transparent shield 82, are the infrared light emitting diode and the lightbulb side by side, at the same end of the housing for emitting light in the same direction. In this embodiment, the power source includes three batteries, coupled together, as a single power source for an extended life. In addition, the flashlight button 76 extends from one peripheral side of the housing to allow a user to more easily locate the flashlight button.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A remote control and flashlight system for combining the benefits of a remote control and a flashlight comprising, in combination:

a housing having of a top portion and a bottom portion with each portion having a first end, a second end, a pair of generally parallel side faces between the first end and second end and a first transverse edge adjacent the first end and a second transverse edge adjacent the second end, the top portion also having an upper face with a plurality of holes, the top portion further having a first aperture in the first end and a second aperture in the second end opening into the transverse edges, the bottom portion having a bottom face with a window and a latchable covering, the bottom portion also having a first end and a second aperture in the second end opening into the transverse edges, the top and bottom portion being coupled together with the first and second transverse edges making contact and the two portions forming a single first circular aperture in the combined first ends and a single second circular aperture in the combined second ends;

an infrared light emitting diode located adjacent to the singular first circular aperture formed in the first end, the infrared light emitting diode being able to transmit a narrow beam of modulated infrared light with that infrared light having a central axis of dissemination;

a lightbulb for emitting visible light located in the single second circular aperture formed in the second end with the lightbulb emitting radiation with a central axis of dissemination being coaxial with the central axis of the infrared light but directed in opposite directions;

a pair of clear plastic covers each having a hemispherical shape with a convex apex and an open concave bottom with the open bottom of the first cover being coupled to the aperture in the combined first ends and the open bottom of the second cover being coupled to the aperture of the second ends such that the apexes point away from the housing, the coverings forming protective layers around the diode and bulb keeping debris out of the housing and preventing hot component from harming a user;

separate power sources being electrically coupled to the infrared light emitting diode and to the lightbulb, the power sources being accessible through the window of the bottom portion; and a plurality of function buttons passing through holes in the housing with control circuitry being adapted to activate and modulate the infrared light source and with an on/off button passing through a hole in the housing to activate and inactivate the lightbulb, the function buttons and associated control circuitry being electrically coupled to the infrared light emitting diode and the power source and with the light bulb electrically coupled to the power source.

2. A remote control and flashlight system comprising:

a housing having of a top portion and a bottom portion with each portion having a first end, a second end, a pair of generally parallel side faces and a first transverse edge adjacent the first end, the top portion also having an upper face with a plurality of holes, the top portion further having a first aperture in the first end opening into the first transverse edge, the bottom portion having a bottom face with a window and a latchable covering, the bottom portion also having a first aperture in the first end opening into the second transverse edge, the top and bottom portion being coupled together with the first and second transverse edges making contact and the two portions forming a single circular aperture in the combined first ends;

an infrared light emitting diode located recessed within the housing adjacent to the aperture formed in the first ends, the infrared light emitting diode being able to transmit a narrow beam of modulated infrared light with that infrared light having a central axis of dissemination;

a lightbulb for emitting visible light located recessed within the housing adjacent the single circular aperture formed in the first ends and to the infrared light emitting diode, the lightbulb emitting radiation with a central axis of dissemination being parallel with the central axis of the infrared light;

a clear plastic cover having a planar shape being coupled to the aperture in the combined first ends and being planar with the first end, the covering forming a protective layer around the diode and bulb keeping debris out of the housing and preventing hot components from harming a user;

a common power source being electrically coupled to the infrared light emitting diode and lightbulb, the power source being accessible through the window of the bottom portion; and a plurality of function buttons passing through holes in the housing with control circuitry being adapted to activate and modulate the infrared light source and with an on/off button passing through a hole in the housing to activate and inactivate the lightbulb, the function buttons and associated control circuitry being electrically coupled to the infrared light emitting diode and the power source and with the light bulb electrically coupled to the power source.

* * * * *